June 11, 1935.  A. C. WALLEN ET AL  2,004,907
COMPOSITE STRUCTURE
Filed May 30, 1930  2 Sheets-Sheet 1
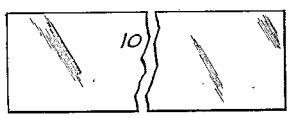
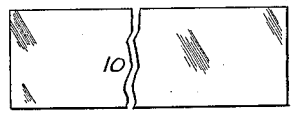
Fig. 1
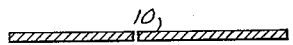
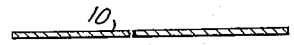
Fig. 2
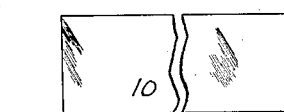
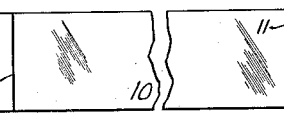
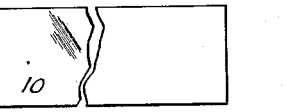
Fig. 3
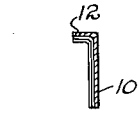
Fig. 4   Fig. 5
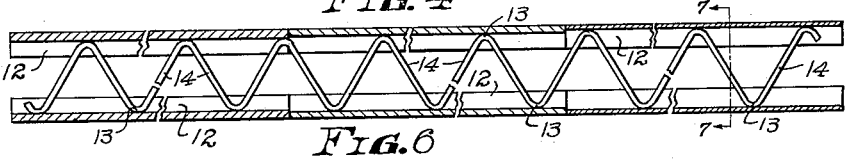
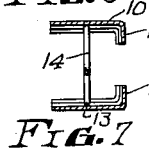
Fig. 6   Fig. 7
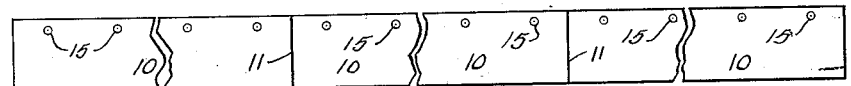
Fig. 8
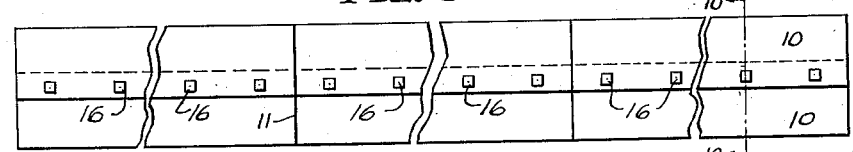
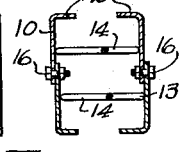
Fig. 9   Fig. 10
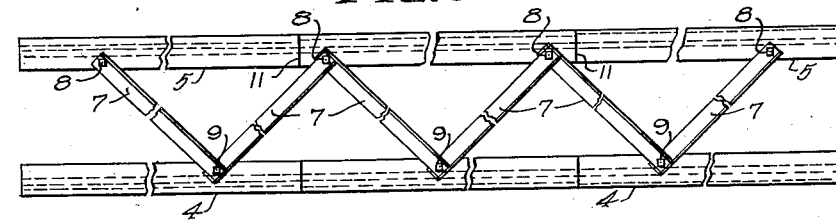
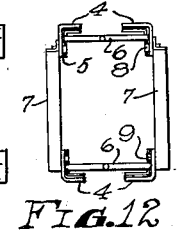
Fig. 11   Fig. 12
Inventors
Arthur C. Wallen and
Thomas J. Crawford
By Bates, Gohrick & Teare
Attorneys

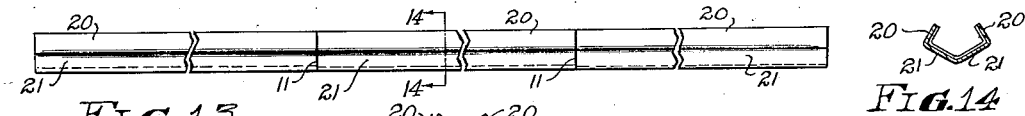
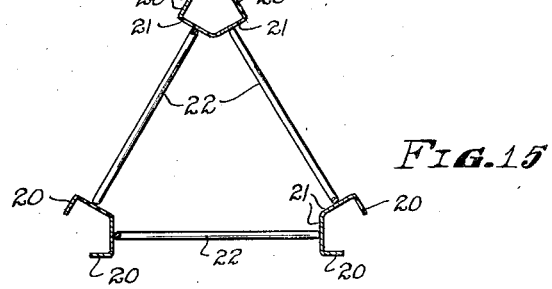
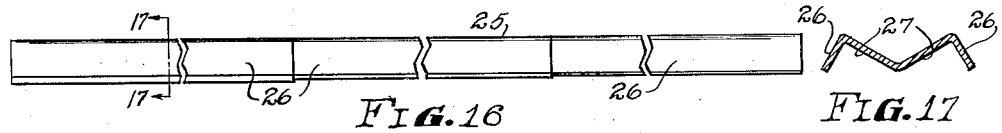
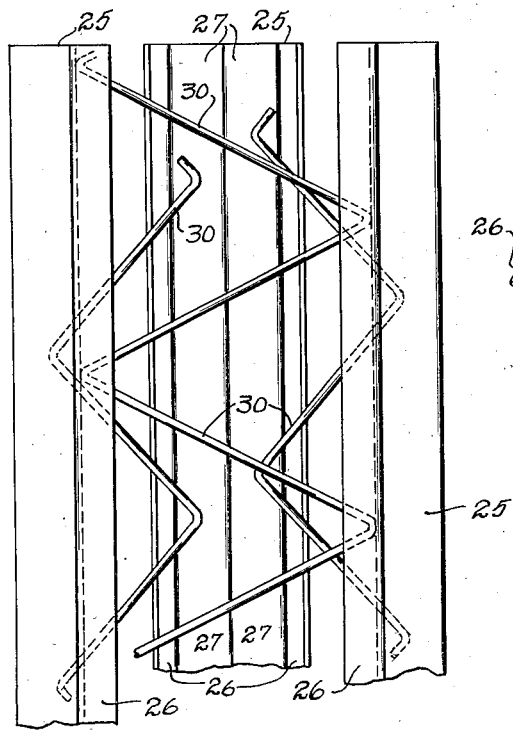
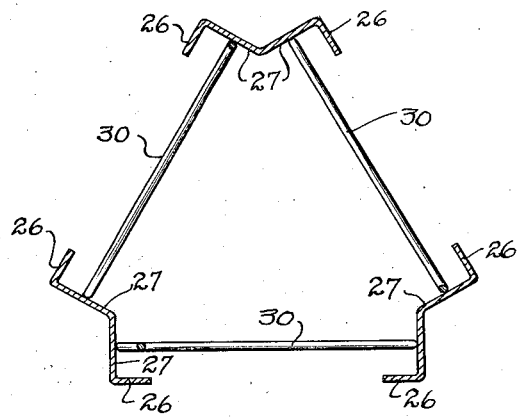

Patented June 11, 1935

2,004,907

UNITED STATES PATENT OFFICE 2,004,907

COMPOSITE STRUCTURE

Arthur C. Wallen, Bronxville, N. Y., and Thomas J. Crawford, Youngstown, Ohio; said Wallen assignor to said Crawford Application May 30, 1930, Serial No. 457,598

2 Claims. (Cl. 189—37)

This invention relates to composite metal structures, which are adapted for use as trusses and poles. As applied to a pole, it comprises an improvement in an invention on a pole, which is illustrated, described and claimed in a co-pending application for Letters Patent of the United States, Serial No. 422,709 filed January 23rd, 1930 by Arthur C. Wallen.

Briefly, the pole illustrated in such copending application is made by butt-welding together the ends of blanks of sheet metal to form strips, and by then deforming each strip longitudially and across the welds to form channel members. Two of such members are then placed in opposition to each other, and connected together by a lattice member. The blanks, which are used to form the longitudinal strips, are substantially the same in width, but different in thickness, wherefore the pole varies progressively in thickness from the bottom to the top. This type of pole is very satisfactory for relatively light loads, but the size is limited to a thickness of metal which can be conveniently rolled after the welding operation is completed. There is considerable demand however, for a pole of materially increased strength with corresponding lightness in weight.

The principal object of the present invention is to make a structure, which has the advantageous features of lightness in weight and economy in manufacture, as are present in the structure illustrated in the copending application heretofore mentioned and yet which can readily be fabricated to effect material increase in the strength thereof.

The preferred manner of accomplishing this object is illustrated in the drawings, wherein Fig. 1 is a plan view of blanks of sheet metal, which are used to form the longitudinal members of the structure; Fig. 2 is a longitudinal section through metallic blanks shown in Fig. 1; Fig. 3 is a plan view showing the blanks butt-welded together to form a single strip; Fig. 4 is a top plan view showing one marginal edge of the strip deformed to provide a flange; Fig. 5 is a section taken on the line 5—5 in Fig. 4; Fig. 6 is a longitudinal section through a structure having longitudinal members formed as shown in Fig. 5; Fig. 7 is a section taken on the line 7—7 in Fig. 6; Fig. 8 is a top plan view of the structure shown in Fig. 6 and illustrates the completion of the piercing operation of the longitudinal members; Fig. 9 is a side-elevation of a structure wherein two parts such as those shown in Fig. 7 are connected together; Fig. 10 is a section taken on the line 10—10 in Fig. 9; Fig. 11 is a side elevation of a modified form of construction; Fig. 12 is a section taken on the line 12—12 in Fig. 11; Fig. 13 is a side-elevation of a longitudinal member made in accordance with the method shown in Figs. 1 to 3, but shaped differently after the completion of the butt-welding operation; Fig. 14 is a section taken on the line 14—14 in Fig. 13; Fig. 15 is a horizontal section through a composite structure made by a joining strips which are shaped, as shown in Fig. 14; Fig. 16 is a side elevation of still another modification of the longitudinal member; Fig. 17 is a section taken on the line 17—17 in Fig. 16; Fig. 18 is a horizontal section through a composite structure made by joining together strips formed as shown in Fig. 17, and Fig. 19 is a side elevation of part of a structure made, as shown in Fig. 18.

We prefer to make the longitudinal members of the structure by taking blanks 10 of sheet metal of different thickness but of substantially the same width, and placing them end to end and then butt-welding the ends together, as on the lines 11. This forms a single-strip, as is shown in Fig. 3. Thereupon, the strip is deformed by turning up a flange 12 along one marginal edge so that in effect, there is formed an angle bar, with one leg longer than the other. Two of such strips so formed are then placed in opposition to each other, and are joined together preferably by welding a lattice bar 14 to the opposite inner faces of the strips. To this end, the lattice bar is shown as having bends 13, which engage the faces of respective strips and are securely welded thereto. As shown in Fig. 7, the lattice bar is positioned at approximately the mid-portion of each strip with the flanges 12 facing inwardly. The relative position of the strips when so fastened are shown in Fig. 7.

After the strips are all formed, as is shown in Figs. 6 and 7, then they are pierced as at 15, at spaced intervals for the reception of bolts or rivets. Two of such composite structures are then fastened together by securing members, which in Figs. 9 and 10, are shown as bolts 16 to form a box-like unitary pole structure. A unit so made may be welded and pierced at the factory, and then bolted or riveted together at the place of use. This enables the parts to be shipped in relatively small units and thereby effects a material saving in freight charges.

A modification of our invention is shown in Figs. 11 and 12, wherein the longitudinal strips after having been previously formed, as shown in Figs. 1, 2 and 3, are then deformed longitudinally to provide L shaped strips having legs 4 and 5, which are substantially equal in width. Two of such strips are placed opposite to each other and are then connected together as by welding a continuous lattice member 6 thereto. The unit thus formed is then connected to a similar unit, as by lattice strips 7, which are bolted at 8 and 9 to the respective strips. Thus, we obtain a composite unitary structure, which may be readily shipped in relatively small crates and assembled at the place of installation.

Another modification of our invention is shown in Figs. 13, 14 and 15, wherein the longitudinal strips, after having been previously formed, as is shown in Figs. 1, 2 and 3, are then deformed along the marginal edges to form flanges 20 and along the middle to form flat faces 21, which extend obliquely to each other. Three of such strips are then placed at the apices of a triangle, and are then connected together by lattice bars 22, which preferably are zigzagged members, and are welded to the opposite faces 21 of the respective strips. The relative position of the strips is such that the plane of each face 21 is disposed at right angles to the plane of the lattice member with which it is connected.

Another modification of our invention is shown in Figs. 16 to 19 wherein the longitudinal member is indicated at 25, as having marginal flanges 26 which face inwardly toward the faces 27. The faces 27 correspond with the faces 21 in the first modification, wherefore in effect the longitudinal member shown in Fig. 13 constitutes a channel wherein the web is bent outwardly to bring the flanges toward each other, whereas in the modification shown in Fig. 16, the longitudinal member comprises a channel in which the web is bent inwardly, thus forcing the flanges away from each other. As shown in Figs. 18 and 19, three of the strips are placed at the apices of a triangle and are joined together by lattice members 30 which are attached, as by welding to the adjacent faces 27 of the respective strips.

A structure made in accordance with the method of the present invention has valuable practical advantages in that the strength may be normally increased with relatively small increase in weight. This result is accomplished by reason of the fact that the longitudinal members are formed of sheet metal, and that the connecting members are relatively light bars, which are welded to the longitudinal members. By modifying the shape of the longitudinal members, various other forms of composite structures may be obtained within the scope of our invention.

We claim:

1. A composite structure comprising three longitudinal members arranged at the apices of a triangle, each member comprising a plurality of structural metal sections of graded thicknesses, joined together in end to end relation by butt welding the ends of each section to adjacent ends of the next sections according to the graded relationship, each of said sections comprising a channel beam having its web bent along a longitudinal line to present two portions at an obtuse angle to each other, while the channel flanges remain each at a right angle to the adjacent web portion, and diagonally positioned rods welded to said web portions and joining said three longitudinal members to form a triangular column of varying strength.

2. A composite structure comprising three longitudinal members arranged at the apices of a triangle, each member comprising a plurality of structural metal sections of graded thicknesses, joined together in end to end relation by butt welding the ends of each section to adjacent ends of the next sections according to the graded relationship, each of said sections comprising a channel beam having its web bent along a longitudinal line to present two portions at an obtuse angle to each other with the flanges converging, whereby the beam in cross section provides a hollow pentagon except for an omitted side, and diagonally positioned rods welded to said web portions and joining said three longitudinal members to form a triangular column of varying strength.

ARTHUR C. WALLEN.
THOMAS J. CRAWFORD.